United States Patent [19]

Huang et al.

[11] Patent Number: 5,684,759
[45] Date of Patent: Nov. 4, 1997

[54] ELECTRONIC TIMER FOR A COFFEE MAKER

[75] Inventors: Wen-Lung Huang, Tainan; Chien-Bang Chion, Tainan Hsien, both of Taiwan

[73] Assignee: Ever Splendor Enterprises Co. Ltd., Taiwan, Taiwan

[21] Appl. No.: 705,532

[22] Filed: Aug. 29, 1996

[51] Int. Cl.$^6$ ............... G04B 47/00; A47J 31/42; H05B 1/02
[52] U.S. Cl. ............... 368/10; 99/281; 219/492; 219/509
[58] Field of Search ............... 368/10; 99/280–283, 99/285, 295, 300, 304, 307; 219/492–494, 501, 505, 508, 509, 510

[56] References Cited

U.S. PATENT DOCUMENTS

| | | | |
|---|---|---|---|
| 4,566,802 | 1/1986 | Koehler | 368/9 |
| 4,917,005 | 4/1990 | Knepler | 99/280 |
| 4,980,540 | 12/1990 | Vancha | 219/492 |
| 5,036,836 | 8/1991 | Patel | 99/281 |
| 5,044,261 | 9/1991 | Kawazoe | 99/280 |
| 5,437,002 | 7/1995 | Bennett | 392/441 |
| 5,463,932 | 11/1995 | Olson | 99/280 |

*Primary Examiner*—Vit W. Miska
*Attorney, Agent, or Firm*—Christensen, O'Connor, Johnson & Kindness pllc

[57] ABSTRACT

An electronic timer activates a switch circuit so as to connect electrically a heating device and a power supplying unit of a coffee maker for a predetermined brewing period in order to heat water that is supplied to a filter basket and that comes from a water reservoir of the coffee maker. The processing unit activates the switch circuit for the predetermined brewing period when the brewing time coincides with the current time. A temperature sensing unit includes a temperature-controlled switch which connects the switch circuit to the heating device when temperature of the heating device is below a lower limit of a predetermined temperature range, and which disconnects the switch circuit from the heating device when the temperature is above an upper limit of the temperature range. The temperature sensing unit further includes a signal generating circuit which interconnects the temperature-controlled switch and the processing unit. The processing unit is prevented from subsequent activation of the switch circuit when duration of a switch-off signal from the signal generating circuit does not exceed a predetermined critical time period.

12 Claims, 3 Drawing Sheets

5,684,759

ELECTRONIC TIMER FOR A COFFEE MAKER

BACKGROUND OF THE INVENTION

1. Field of the Invention

The invention relates to an electronic timer, more particularly to an electronic timer which can activate a coffee maker at a preset time of day and which can automatically deactivate the coffee maker when a water reservoir of the coffee maker is empty.

2. Description of the Related Art

The use of electronic timers to activate a household appliance at a preset time of day is known in the art. For example, installation of such timers in coffee makers offers the advantage of having freshly brewed coffee when the consumer arises the next day. However, the conventional electronic timer will activate the coffee maker even when the water reservoir of the coffee maker is empty. Activation of the coffee maker under this condition results in waste of energy and may be a source of fire.

SUMMARY OF THE INVENTION

Therefore, the object of this invention is to provide an electronic timer which can activate a coffee maker at a preset time of day and which can automatically deactivate the coffee maker when a water reservoir of the coffee maker is empty.

Accordingly, the electronic timer of this invention is used to activate a switch circuit so as to connect electrically a heating device and a power supplying unit of a coffee maker for a predetermined brewing period. The heating device is used to heat water that is supplied to a filter basket and that comes from a water reservoir of the coffee maker. The electronic timer comprises:

processing means having an internal clock for registering a current time of day, and an internal register for storing a preset brewing time, the processing means being operable in an automatic mode, wherein the processing means is adapted to activate the switch circuit for the predetermined brewing period so as to heat the water that is supplied to the filter basket when the brewing time coincides with the current time; and temperature sensing means including a temperature-controlled switch which is adapted to connect the switch circuit to the heating device so as to permit activation of the heating device when temperature of the heating device is below a lower limit of a predetermined temperature range and to disconnect the switch circuit from the heating device so as to deactivate the heating device when the temperature of the heating device is above an upper limit of the predetermined temperature range, the temperature sensing means further including a signal generating circuit which interconnects the temperature-controlled switch and the processing means and which is adapted to be connected to the power supplying unit via the temperature-controlled switch, the signal generating circuit generating a switch status signal received by the processing means, the switch status signal being a switch-on signal when the temperature-controlled switch connects the switch circuit to the heating device, and being a switch-off signal when the temperature-controlled switch disconnects the switch circuit from the heating device;

the processing means further including means for preventing subsequent activation of the switch circuit when duration of the switch-off signal from the signal generating circuit does not exceed a predetermined critical time period.

BRIEF DESCRIPTION OF THE DRAWINGS

Other features and advantages of this invention will become apparent in the following detailed description of the preferred embodiment with reference to the accompanying drawings, of which.

DETAILED DESCRIPTION OF THE PREFERRED EMBODIMENT

Figure 1:
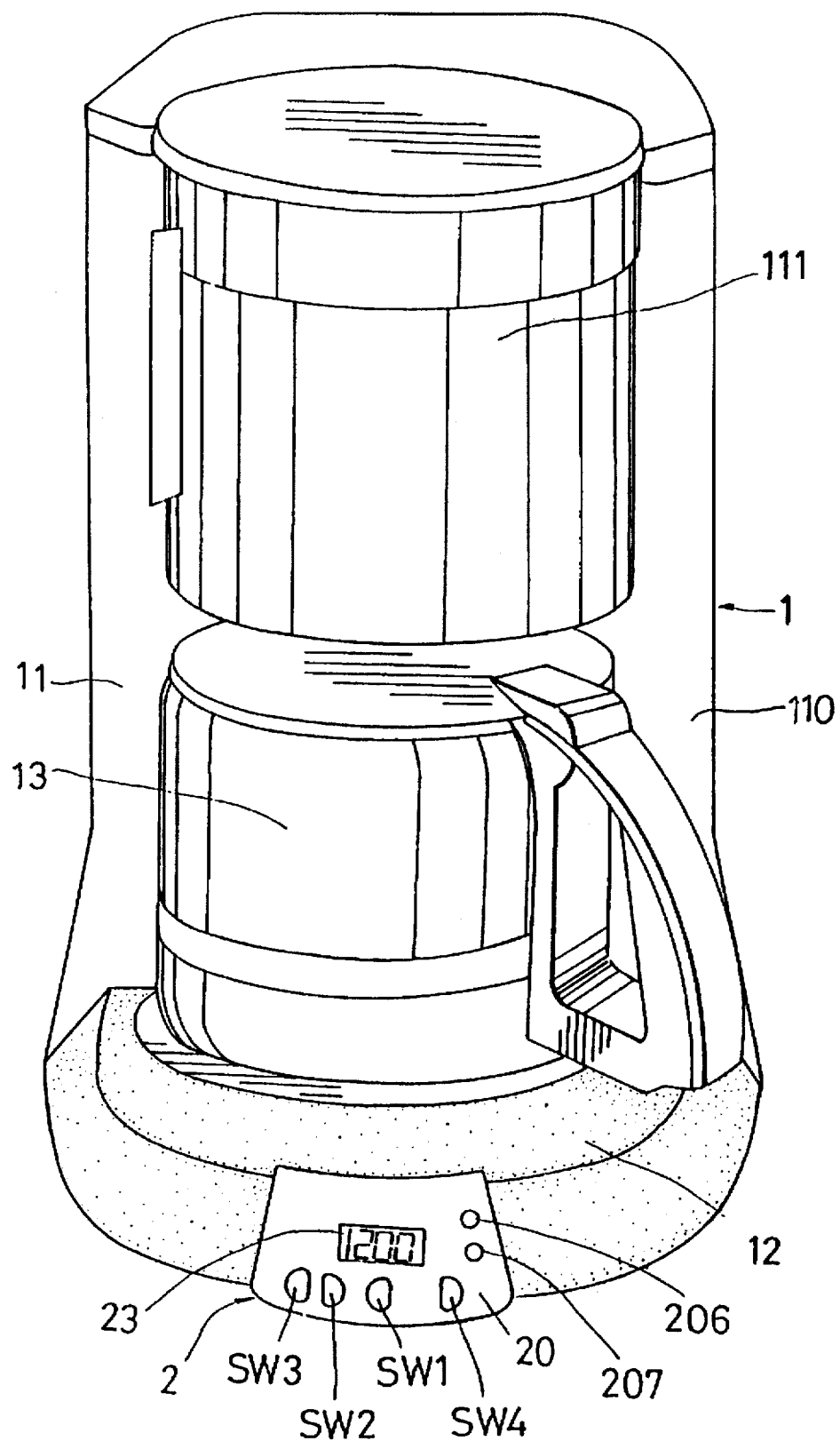
FIG. 1 is a perspective view of a coffee maker which incorporates the preferred embodiment of an electronic timer according to this invention.

Turning now to FIG. 1, there is shown a coffee maker 1 which incorporates the preferred embodiment of an electronic timer 2 according to this invention. The coffee maker 1 includes a main housing 11 that is formed with a water reservoir 110 for receiving water and a filter basket 111 for receiving ground coffee therein. Water from the water reservoir 110 is supplied to the filter basket 111 via a metal tube (not shown) in a known manner. The main housing 11 further has a base 12 for placing a carafe 13 thereon such that an opening (not shown) formed in a top end of the carafe 13 is located immediately below an outlet port (not shown) of the filter basket 111. The timer 2 includes a control panel 20 which is mounted on the base 12 and which is used to set the timer 2. The control panel 20 includes a digital display 23, two indicator lights 206, 207 and a user input unit constituted by four function buttons SW1, SW2, SW3, SW4. The function buttons SW1, SW2 are used to set the current time and the brewing time. The function button SW3 is operated when setting the brewing time. The function button SW4 is operated to set selectively the operation of the timer 2 in an OFF mode, an automatic mode and an ON mode, wherein the coffee maker 1 can be activated regardless of the time of day. The indicator light 206 is used to indicate operation of the timer 2 in the ON mode. The indicator light 207 is used to indicate operation of the timer 2 in the automatic mode.

Figure 2:
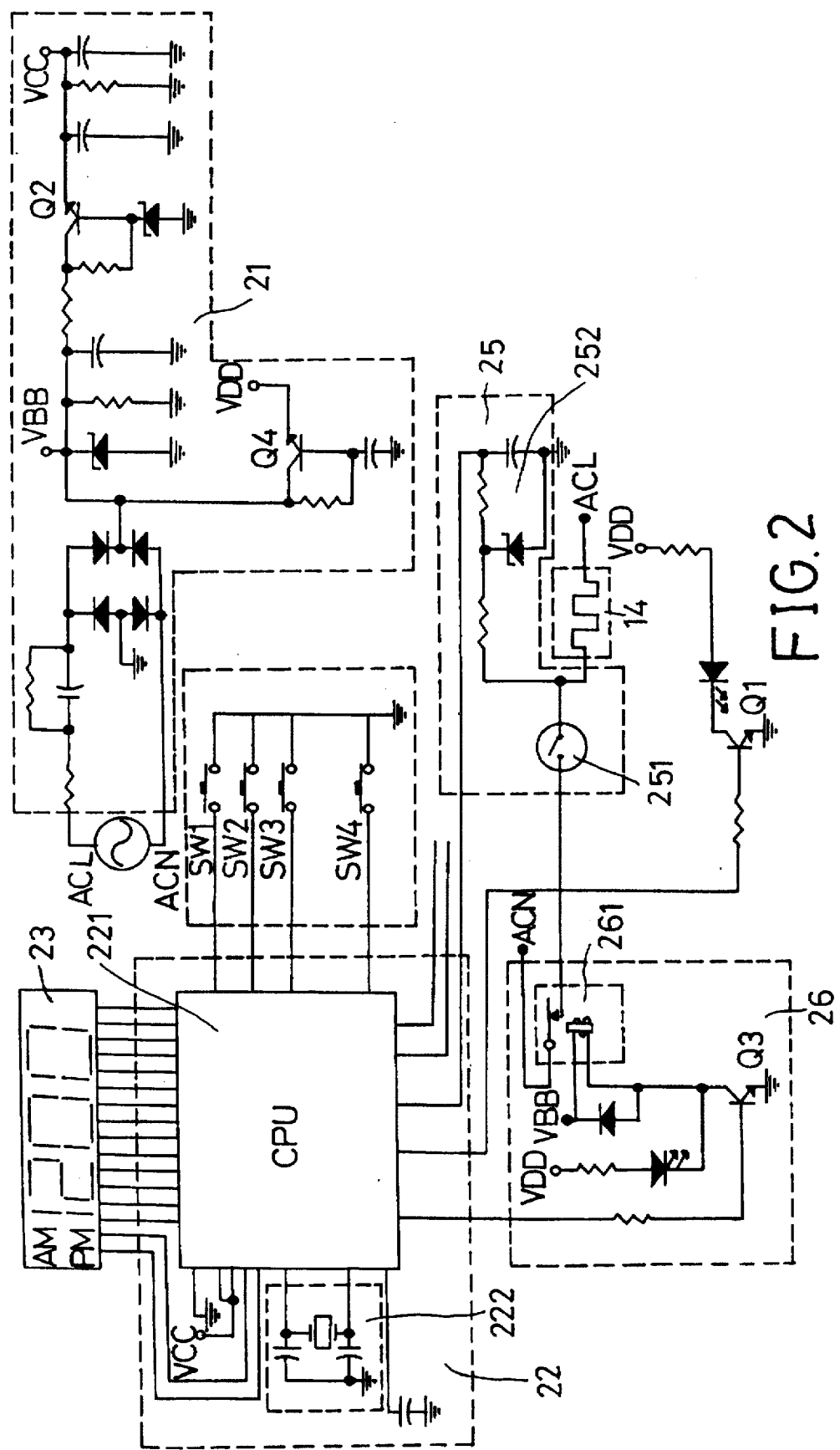
FIG. 2 is a schematic circuit diagram of the preferred embodiment.

Referring to FIG. 2, the coffee maker 1 further includes a heating device 14 for heating the water that is supplied to the filter basket 111 and that comes from the water reservoir 110 in a known manner, a power supplying unit 21, and a switch circuit 26 which is activable so as to connect electrically the heating device 14 and the power supplying unit 21. The timer 2 further includes a processing circuit 22 and a temperature sensing unit 25.

The processing circuit 22 includes a central processing unit (CPU) 221 and an oscillator circuit 222. The oscillator circuit 222, which provides clock pulse signals to the central processing unit 221, includes a 32.768 kHz crystal oscillator and capacitor filters to minimize the presence of noise signals. The central processing unit 221, which is connected to the user input unit and the digital display 23, has an internal clock which can be set by operating the function buttons SW1, SW2 so as to register the current time of day to be indicated by the digital display 23. The central processing unit 221 further has an internal register for storing a brewing time which can be preset by operating the function buttons SW1, SW2, SW3. The central processing unit 221 generates a BREW signal when the brewing time coincides with the current time. Preferably, the BREW signal is automatically extinguished after a predetermined brewing period which may be chosen by the consumer from several factory-set values. In this embodiment, the brewing period may range from 15 to 130 minutes. Once the current and brewing times are set, the BREW signal can be generated on a daily basis whenever the brewing time coincides with the current time.

The switch circuit 26 includes a relay 261 which interconnects the power supplying unit 21 and the heating device 14. The switch circuit 26 further includes a transistor Q1 which interconnects the relay 261 and the central processing unit 221. The transistor Q1 receives the BREW signal from the central processing unit 221, and energizes the relay 261 so as to interconnect electrically the heating device 14 and the power supplying unit 21 in order to heat the water that is supplied to the filter basket 111 when the BREW signal is generated.

The temperature sensing unit 25 includes a temperature-controlled switch 251 which is connected to the switch circuit 26 and the heating device 14. The temperature sensing unit 25 is capable of maintaining the temperature of the heating device 14 within a predetermined temperature range. In this embodiment, the predetermined temperature range is 145° C. ±5° C. Thus, the switch 251 connects the switch circuit 26 to the heating device 14 to permit activation of the heating device 14 when the temperature of the latter drops below 140° C., and disconnects the switch circuit 26 from the heating device 14 to deactivate the heating device 14 when the temperature exceeds 150° C. The temperature sensing unit 25 further includes a signal generating circuit 252 which is connected to the power supplying unit 21 via the switch 251 and which is further connected to the central processing unit 221. The signal generating circuit 252 generates a switch status signal which is received by the central processing unit 221 and which corresponds to the status of the switch 251. The switch status signal is a switch-on signal when the switch 251 connects the switch circuit 26 to the heating device 14, and is a switch-off signal when the switch 251 disconnects the switch circuit 26 from the heating device 14.

When the water reservoir 110 is empty, the time required for the temperature of the heating device 14 to change from the upper limit of the predetermined temperature range to the lower limit of the same will not exceed a predetermined critical time period. Thus, in order to prevent activation of the heating device 14 when the water reservoir 110 is empty, the central processing unit 221 incorporates means for preventing subsequent generation of the BREW signal when the duration of the switch-off signal from the signal generating circuit 252 does not exceed the critical time period. The critical time period depends upon the capacity of the coffee maker 1 and is normally set to about two minutes.

Figure 3:
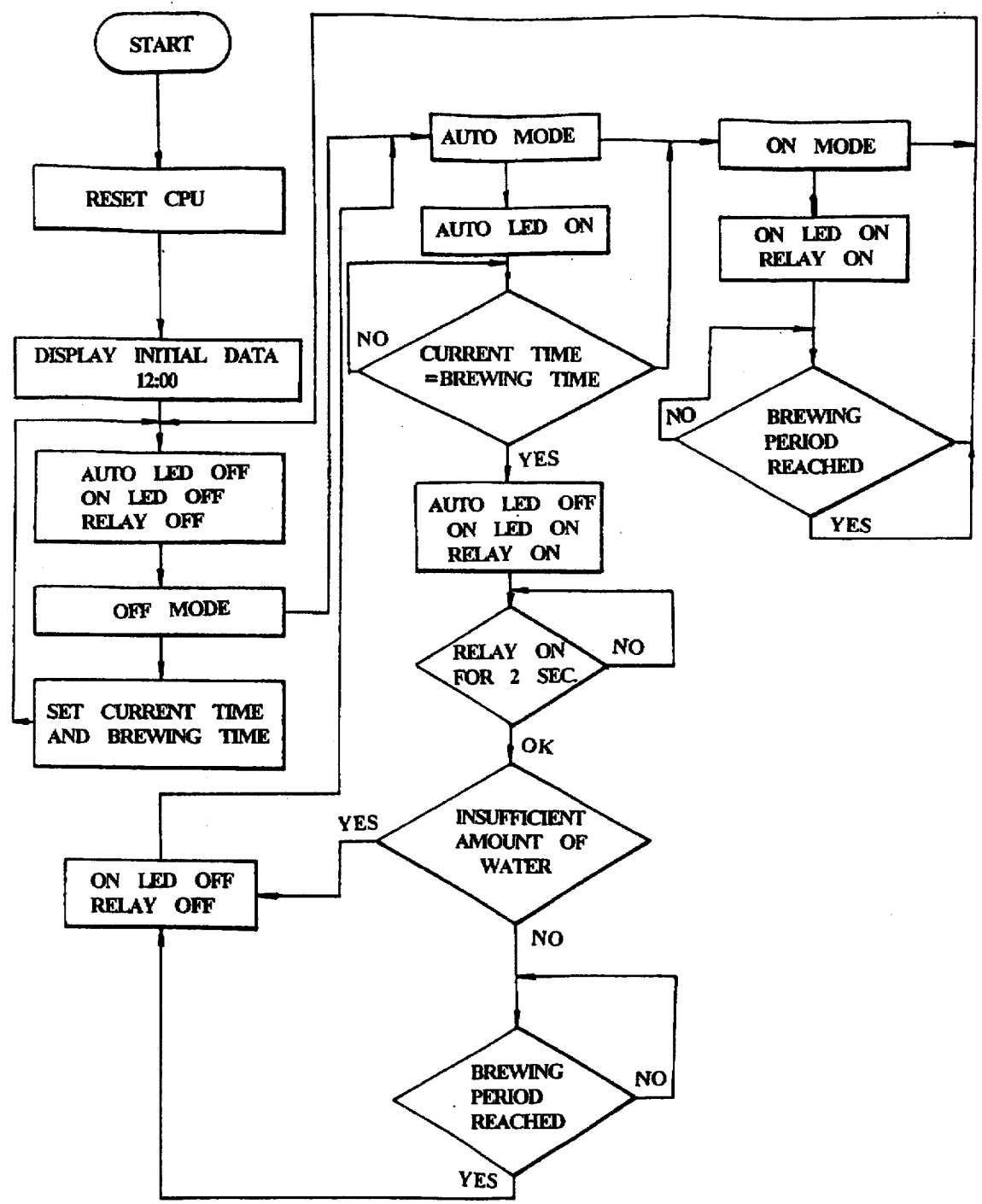
FIG. 3 is a flowchart which illustrates the operation of the preferred embodiment.

FIG. 3 is a flowchart which illustrates the operation of the preferred embodiment. Referring to FIGS. 2 and 3, the central processing unit 221 is reset when power is supplied thereto for the first time. The central processing unit 221 then controls the digital display 23 to display initial time information thereon. At this time, the indicator lights 206, 207 and the relay 261 are deactivated, and the timer 2 is in the OFF mode. In this mode, the function buttons SW1, SW2, SW3 can be operated so as to set the current time and the brewing time.

When the function button SW4 is operated so as to set the timer in the ON mode, the central processing unit 221 activates the indicator light 206 and the transistor Q1, thereby energizing the relay 261 to result in electrical connection between the power supplying unit 21 and the heating device 14 via the switch 251. The timer automatically reverts to the OFF mode when the predetermined brewing period is reached.

When the function button SW4 is operated so as to set the timer in the automatic mode, the central processing unit 221 activates the indicator light 207 and waits until the current time coincides with the brewing time. When the current time coincides with the brewing time, the central processing unit 221 deactivates the indicator light 207 and activates the indicator light 206. The central processing unit 221 further activates the transistor Q1, thereby energizing the relay 261 to result in electrical connection between the power supplying unit 21 and the heating device 14 via the switch 251. After the relay 261 has been turned on for two seconds, the temperature of the heating device 14 gradually increases until the upper limit of the predetermined temperature range is reached. At this time, the switch 251 is turned off, thereby deactivating the heating device 14 to result in a gradual decrease in the temperature of the latter. The signal generating circuit 252 then ceases to generate the switch-on signal and provides the switch-off signal to the central processing unit 221.

As mentioned beforehand, if the water reservoir 110 is empty, the time period starting from the time when the upper limit of the predetermined temperature range was reached to the time when the lower limit of the temperature range was reached will not exceed the critical time period of two minutes. Thus, by continuously monitoring the switch status signal from the signal generating circuit 252, the central processing unit 221 will be able to determine whether or not the water reservoir 110 is empty.

If the duration of the switch-off signal from the signal generating circuit 252 does not exceed the critical time period, meaning that the water reservoir 110 is empty, the central processing unit 221 automatically deactivates the indicator light 206 and the transistor Q1. Since the central processing unit 221 is inhibited from further generation of the BREW signal, the relay 261 is deenergized in order to stop further operation of the heating device 14. If the duration of the switch-off signal exceeds the critical time period, meaning that there is water in the water reservoir 110, the central processing unit 221 permits continued operation of the heating device 14 until the predetermined brewing period is reached. By then, the central processing unit 221 deactivates the indicator light 206 and the transistor Q1 to stop further operation of the heating device 14.

It has thus been shown that electronic timer of this invention can be used to activate a coffee maker at a preset time of day and can automatically deactivate the coffee maker when a water reservoir of the latter is empty, thereby preventing energy waste and the occurrence of a fire due to unattended operation of the coffee maker. The object of this invention is thus met.

While this invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. An electronic timer for activating a switch circuit so as to connect electrically a heating device and a power supplying unit of a coffee maker for a predetermined brewing period, the heating device being used to heat water that is supplied to a filter basket and that comes from a water reservoir of the coffee maker, said electronic timer comprising:

processing means having an internal clock for registering a current time of day, and an internal register for storing a preset brewing time, said processing means being operable in an automatic mode, wherein said processing means is adapted to activate the switch circuit for the predetermined brewing period so as to heat the water that is supplied to the filter basket when the brewing time coincides with the current time; and temperature sensing means including a temperature-controlled switch which is adapted to connect the switch circuit to the heating device so as to permit activation of the heating device when temperature of the heating device is below a lower limit of a predetermined temperature range and to disconnect the switch circuit from the heating device so as to deactivate the heating device when the temperature of the heating device is above an upper limit of the predetermined temperature range, said temperature sensing means further including a signal generating circuit which interconnects said temperature-controlled switch and said processing means and which is adapted to be connected to the power supplying unit via said temperature-controlled switch, said signal generating circuit generating a switch status signal received by said processing means, the switch status signal being a switch-on signal when said temperature-controlled switch connects the switch circuit to the heating device, and being a switch-off signal when said temperature-controlled switch disconnects the switch circuit from the heating device;

said processing means further including means for preventing subsequent activation of the switch circuit when duration of the switch-off signal from said signal generating circuit does not exceed a predetermined critical time period.

2. The electronic timer as claimed in claim 1, further comprising display means connected to and controlled by said processing means so as to indicate time information thereon.

3. The electronic timer as claimed in claim 1, wherein the critical time period is about two minutes.

4. The electronic timer as claimed in claim 1, wherein said processing means is further operable in an OFF mode, in which said processing means is prevented from activating the switch circuit even when the current time coincides with the brewing time, and an ON mode, in which said processing means activates the switch circuit for the predetermined brewing period regardless of whether the current time coincides with the brewing time.

5. The electronic timer as claimed in claim 4, further comprising user input means connected to said processing means and operable so as to set the current time of day of said internal clock and the brewing time in said internal register.

6. The electronic timer as claimed in claim 5, wherein said user input means is further operable so as to set operation of said processing means in one of said OFF mode, said automatic mode and said ON mode.

7. A coffee maker including a filter basket, a water reservoir for receiving water that is to be supplied to said filter basket, a heating device for heating the water from said water reservoir, a power supplying unit for supplying power to said heating device, a switch circuit activable so as to connect electrically said heating device and said power supplying unit, and an electronic timer for activating said switch circuit for a predetermined brewing period, wherein said electronic timer comprises:

processing means connected electrically to said switch circuit and having an internal clock for registering a current time of day, and an internal register for storing a preset brewing time, said processing means being operable in an automatic mode, wherein said processing means activates said switch circuit for the predetermined brewing period so as to heat the water that is supplied to said filter basket when the brewing time coincides with the current time; and temperature sensing means including a temperature-controlled switch which connects electrically said switch circuit to said heating device so as to permit activation of said heating device when temperature of said heating device is below a lower limit of a predetermined temperature range and to disconnect said switch circuit from said heating device so as to deactivate said heating device when the temperature of said heating device is above an upper limit of the predetermined temperature range, said temperature sensing means further including a signal generating circuit which interconnects said temperature-controlled switch and said processing means and which is connected to said power supplying unit via said temperature-controlled switch, said signal generating circuit generating a switch status signal received by said processing means, the switch status signal being a switch-on signal when said temperature-controlled switch connects said switch circuit to said heating device, and being a switch-off signal when said temperature-controlled switch disconnects said switch circuit from said heating device;

said processing means further including means for preventing subsequent activation of said switch circuit when duration of the switch-off signal from said signal generating circuit does not exceed a predetermined critical time period.

8. The coffee maker as claimed in claim 7, wherein said electronic timer further comprises display means connected to and controlled by said processing means so as to indicate time information thereon.

9. The coffee maker as claimed in claim 7, wherein the critical time period is about two minutes.

10. The coffee maker as claimed in claim 7, wherein said processing means is further operable in an OFF mode, in which said processing means is prevented from activating said switch circuit even when the current time coincides with the brewing time, and an ON mode, in which said processing means activates said switch circuit for the predetermined brewing period regardless of whether the current time coincides with the brewing time.

11. The coffee maker as claimed in claim 10, wherein said electronic timer further comprises user input means connected to said processing means and operable so as to set the current time of day of said internal clock and the brewing time in said internal register.

12. The coffee maker as claimed in claim 11, wherein said user input means is further operable so as to set operation of said processing means in one of said OFF mode, said automatic mode and said ON mode.

* * * * *

UNITED STATES PATENT AND TRADEMARK OFFICE
CERTIFICATE OF CORRECTION

PATENT NO. : 5,684,759
DATED : November 4, 1997
INVENTOR(S) : W.-L. Huang et al.

It is certified that error appears in the above-indentified patent and that said Letters Patent is hereby corrected as shown below:

| COLUMN | LINE | | |
|---|---|---|---|
| [75] Pg. 1, col. 1 | Inventors | "Tainan;" should read --Tainan City;-- | |
| [73] Pg. 1, col. 1 | Assignee | After "Co." insert --,-- | |
| [73] Pg. 1, col. 1 | Assignee | "Taiwan, Taiwan" should read ---Tainan City, Taiwan-- | |

Signed and Sealed this

Seventh Day of April, 1998

Attest:

BRUCE LEHMAN

Attesting Officer

Commissioner of Patents and Trademarks